P. B. DELANY.
TELEGRAPHY.
APPLICATION FILED JAN. 18, 1909.
1,108,147.
Patented Aug. 25, 1914.
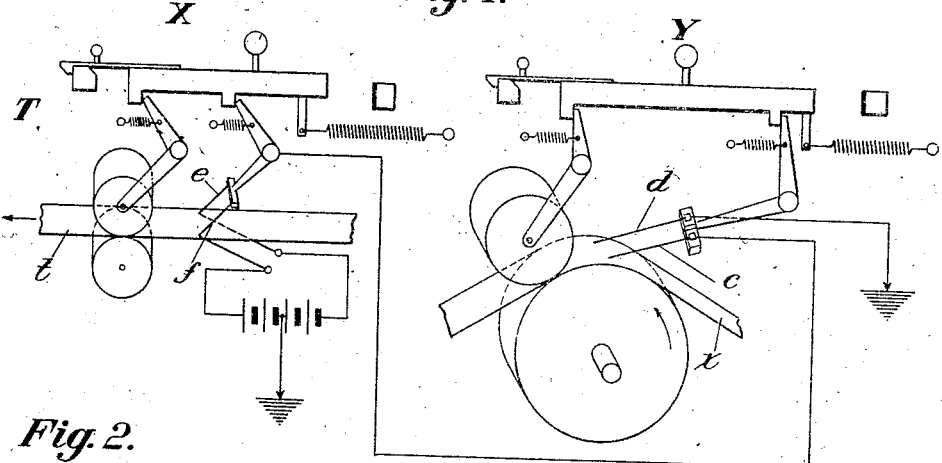
Fig. 1.
Fig. 2.
Fig. 3.
Fig. 4.
Fig. 5.
Fig. 6.
Fig. 7.
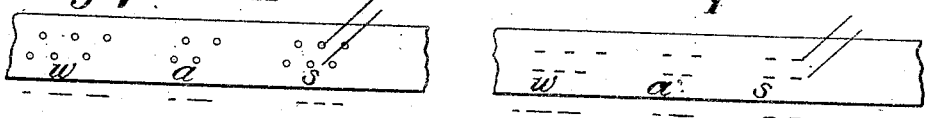
Witnesses:
L. L. Browning
E. F. Weibes
Inventor
Patrick B. Delany
By his Attorney
Edward C. Davidson

UNITED STATES PATENT OFFICE.

PATRICK B. DELANY, OF SOUTH ORANGE, NEW JERSEY, ASSIGNOR TO THE TELEPOST COMPANY, OF NEW YORK, N. Y., A CORPORATION OF MAINE.

TELEGRAPHY.

1,108,147. Specification of Letters Patent. Patented Aug. 25, 1914.

Application filed January 18, 1909. Serial No. 472,939.

*To all whom it may concern:*

Be it known that I, PATRICK B. DELANY, a citizen of the United States of America, residing in South Orange, in the county of Essex, State of New Jersey, have invented certain Improvements in Telegraphy, of which the following is a specification.

This invention relates to automatic chemical telegraphy in which each signal, whether a dot or a dash, is initiated by a current impulse of one polarity and terminated by a current impulse of opposite polarity, all the impulses being of equal duration and the dots and dashes distinguished by the interval of time elapsing between the transmission of the initiating and terminating impulses—such interval being longer in the transmission of a dash than when a dot is transmitted. In such a system both impulses are recorded in parallel lines on the chemical receiving tape, and the impulses may be sent into the line by means of angularly disposed perforations formed in parallel lines in a transmitting tape. Letters Patent No. 507,791, granted October 31, 1893 disclose a system of this general character. Where the signals are transmitted at moderate speed over a line of little or no capacity the record on the receiving tape will be definitely legible, a straight line connecting the two marks constituting a dot signal showing much less angular displacement than a line connecting the two marks constituting the record of a dash signal. At higher speeds, however, or over lines having considerable electro-static capacity the difference of angle between dots and dashes, always a matter of comparison, is not so readily discernible.

The present invention comprises a mode of operation affording clearly legible definition of the received records whether the line has much or no capacity and comprehends an arbitrary disposition of the dots or marks upon the receiving tape other than the natural one due only to the regular sequence upon the line of the current impulses of alternating polarity. Thus, if straight lines directly connecting, on the receiving tape, the front ends of the two marks, constituting the record of each dot signal, are always perpendicular to the tape or inclined toward the left; and straight lines directly connecting the front ends of the respective pairs of marks constituting the record of dashes, always incline to the right, the definition between dot and dash signals recorded on the receiving tape is clear and unmistakable irrespective of the amount of capacity of the line. Experience has demonstrated that this highly desired result may be realized by the simple expedient of extending beyond its mate and in the direction of travel of the receiving tape that one of the recording fingers that makes a record of the signal-terminating impulse. The extension of such finger in advance of its mate may be such as to equal the space, or the interval of time, between the transmission of the impulse initiating a dot signal and that terminating such signal, thus causing the last impulse of a dot signal arriving at the receiver to appear on the tape just as the record of the first impulse has passed into vertical alinement with it so that the two dot marks on the tape are in a line perpendicular to the length of the tape. If the recording finger in question be further extended, then the mark produced by it may be in advance of the mark produced by its mate, so that a straight line connecting them will incline to the left. The dash having about three times the length (*i. e.* interval between impulses) of a dot the angular disposition of the marks upon the receiving tape is well defined and corresponds approximately to twice the dot length. As dot and dash lengths are construed relatively the actual length is, in practice, not material, and as a matter of fact in operation of ordinary Morse the dashes made by Morse key, auto-dot and key board transmitters generally fall short of the theoretical length.

Over a line of very little or no "capacity" the elements of letters, dots and dashes, are respectively of uniform size. The perpendicular position or slightly reverse angle of the recorded dot marks eliminates all doubt as to the identity of the characters. Over circuits having "capacity" verification of the reading line is realized in the negative or upper line, as all the "tailing" in the reading line, the lower line of characters, is in the direction of bridging the angle between the marks representing dashes, while the tailings of the reverse characters represent and emphasize spacing between letters and words. As every dot and dash is finished with a reversal of current the effect of the static current is always the same—marking the termination of any succession of reversals. It will be seen that this system of recording has important advantages. It is not necessary to add "capacity" to a circuit for the completion of a dash, its boundaries being plainly marked by the two marks angularly disposed, so that the natural "capacity" record between need not extend to the limit. The last dot or mark of the dash leaves no room for doubt. In this way all lines can be worked upon the basis of their natural condition, the extremes calling for no artificial balancing, signals of uniform size over a line without capacity being perfectly plain while those over a line from moderate to great capacity are recorded in dot marks and actual dash marks.

In the accompanying drawings: Figure 1 is a diagram indicating a transmitting and receiving station: and Figs. 2, 3, 4, 5 and 6 respectively are views showing sections of tape with received signals recorded chemically thereon according to the Universal Code: and Fig. 7 indicates diagrammatically a section of perforated transmitting tape, a section of receiving tape, and the relative arrangement of the respective transmitting and recording fingers.

Referring now to Fig. 1, the transmitter T at X is sending impulses of equal duration and reverse polarity from the perforated tape $t$ (as already well understood) by means of the transmitting brushes or fingers $e, f$. At receiving station Y the recording pens or fingers $c$ and $d$ are resting on the chemically prepared tape $x$. The upper finger is extended in advance of its mate as described. The arrangement may be such as to bring the marks constituting a dot signal in line perpendicular to the tape, and the marks constituting a dash signal will of necessity be angularly disposed.

Fig. 2 represents a received record free from static current effects on which the dot marks are in line perpendicular to the tape.

Fig. 3 represents a record over a line with slight static capacity.

Fig. 4 represents a record over a line with considerable capacity.

Fig. 5 represents a record over a line having sufficient capacity to completely fill out the dash at a transmission speed of, say, one thousand words a minute.

Fig. 6 represents a record in which the dots constituting a dot signal are angularly disposed with an inclination to the left.

No change in atmospheric conditions affecting the static capacity of the line will affect the efficiency of the receiver, nor will a change from one wire to another call for any alteration, the method being always adapted to the highest and lowest signaling facility of the wire, from an overhead line of ten miles, to a long circuit of underground cable.

I claim:

A chemical tape receiver having two recording fingers one of which makes on the tape in one line a record of the signal initiating impulses, and the other in a parallel line a record of the signal terminating impulses, the latter finger being extended beyond its mate in the direction of travel of the tape combined with a transmitter that sends signal initiating impulses and signal terminating impulses, said impulses being of alternating polarity.

In testimony whereof, I have hereunto subscribed my name.

PATRICK B. DELANY.

Witnesses:
CHAS. E. PERKINS,
B. E. HOLLEY.